J. R. SCOHY.
INTERNAL LOCK BAIT FOR DRAWING GLASS.
APPLICATION FILED OCT. 30, 1918.
1,311,137.
Patented July 22, 1919.
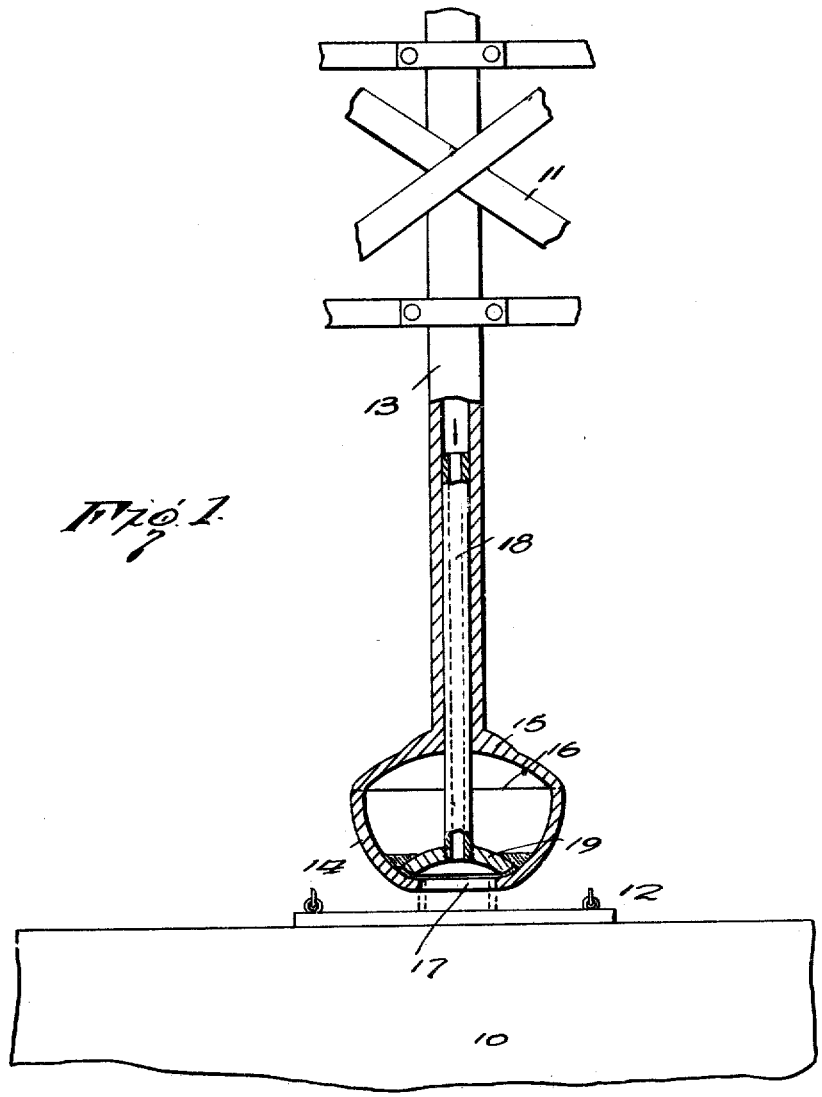
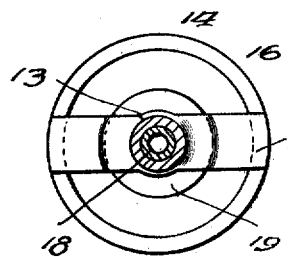
John R. Scohy, Inventor
By Geo. P. Kimmel, Attorney

UNITED STATES PATENT OFFICE.

JOHN R. SCOHY, OF OKMULGEE, OKLAHOMA.

INTERNAL-LOCK BAIT FOR DRAWING GLASS.

1,311,137.

Specification of Letters Patent. Patented July 22, 1919.

Application filed October 30, 1918. Serial No. 260,319.

*To all whom it may concern:*

Be it known that I, JOHN R. SCOHY, a citizen of the United States, residing at Okmulgee, in the county of Okmulgee and State of Oklahoma, have invented certain new and useful Improvements in Internal-Lock Baits for Drawing Glass, of which the following is a specification.

This invention relates to an apparatus for drawing cylinders for molten glass and more particularly to an improved bait for carrying out the drawing operation, the object thereof being to provide an internal lock bait for simplifying the drawing operation and permitting the same to be carried on more quickly, especially for drawing hollow ware from a mass of molten glass.

The object of the invention is to provide an improved bait having an internal lock which will prevent the breaking of the glass due to contraction and expansion and also eliminate the possibility of a cylinder cracking or falling off at the bait.

A further object of the invention is to provide an improved bait which when dipped in the molten glass, will cause the latter to flow up between the bait and the interlock, and the glass being located between said bait and the interlock, a positive retention is secured. Furthermore, as the parts are cooler than the glass, the glass will set at once and allow the pulling of the cylinder immediately, thus avoiding waiting for glass to set and eliminating practically all contraction owing to the fact that it is not necessary to allow the bait to set in the molten glass until the glass adheres to the same.

With the above and other objects in view, as will appear as the description proceeds, the invention comprises the novel features of construction, combinations of elements and arrangement of parts which will be more fully described in the following specification and then finally embodied in the clauses of the claim which is appended hereto and which forms an essential part of the same.

Reference is had to the accompanying drawings forming a part of this application, wherein similar reference characters will refer to corresponding parts thoughout the several views, in which Figure 1 is a vertical sectional view showing my improved internal lock bait as applied to a glass drawing apparatus, and Fig. 2 is a horizontal sectional view of the bait looking downwardly.

Referring to the drawings in detail, I have shown my improved bait applied to a glass drawing apparatus including the dog house 10 of a furnace and a drawing apparatus 11, the dog house having provided therein, the usual top opening through which is vertically movable a shield 12 in the usual manner.

The bait includes a tubular stem or neck portion 13 at the lower end of which there is provided a bowl-like member 14 connected to the tubular portion by the cross strip 15 diametrically disposed. The upper edge of the bowl-like portion 14 terminates short of the connecting or strip portion 15, as shown at 16 and said bowl-like portion is provided with an opening 17 in the bottom portion thereof of reduced size relative to the top portion for a purpose as will presently appear.

Movable in the tubular portion or neck 13 is a plunger 18 at the lower end of which there is provided a concavo-convex flange portion 19 forming an interlock, with the convexed face thereof disposed upwardly and the concaved face thereof disposed downwardly. The plunger 18 is tubular or is a pipe, and has threaded engagement with the flange portion 19 at its lower end, through the medium of a central or axially disposed threaded opening in the flange. The outer edge of this portion 19 is designed to engage the inner or concaved face of the bowl portion 14 of the bait. As the parts are of metal, preferably iron, they will tend to sink in the molten glass, but the part 14 being forced independently of the part 19, will result in the latter being buoyed up or unseated from the inner face 14, thus uncovering the opening 17 and allowing the glass to pass up between 19 and 14. However, the means for actuating the member 13, that is, raising and lowering it, is immaterial, while the air passes through the member 18 in drawing the cylinders from the glass in the pot or tank, dog house or any body of glass desired. The action described is also due to the fact that the member 18 is loose in 13 and as 19 remains still or stationary for an instant, as it is also lighter than 14, or does not sink as fast, glass passes under flange 19 and 18 working freely in 13 and having no weight but its own, simply moves by gravity, downwardly in the glass in bowl 14 thereby preventing the glass from pulling or rolling out while hot, and in consequence catching or binding the glass under and around the edges of the flange 19 within the bowl 14.

In the operation of the device, the bait is lowered into the molten glass by means of the drawing apparatus and the glass enters the bait between the portions 14 and 19 through the opening 17 and the interlocking part 19 being forced upwardly as set forth and falling downwardly, the glass is positively retained. As air pressure is used in the blowing and cooling apparatus of a device of this character, the same is readily obtainable for use as specified at a negligible cost. Contraction is also practically eliminated, as it is not necessary to allow the glass to cool, but only necessary to allow the glass to set or the bait to set in the molten glass until the glass adheres to the same, in view of the clamping operation effected by the inverted lock and bait as specified, thereby eliminating contraction and expansion in the drawing of hollow ware from a mass of molten glass and thereby preventing the breaking of the glass due to such causes as well as eliminating the possibility of a cylinder cracking or falling off at the bait.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

In a glass drawing apparatus, the combination with a furnace having a dog house with an opening and shield therein or the like, a bait raising and lowering apparatus, and a bait held therein, said bait comprising a tube adapted to receive a supply of compressed air or the like, said tube having a transverse portion at the lower end thereof and a bowl portion depending from said transverse portion and provided with an opening in the bottom portion thereof restricted as respects to the opening in the top portion thereof, and a plunger operable in said tube and adapted to move downwardly by gravity while the tube and bowl are forced downwardly, said plunger having a concavo-convex flange at the lower portion thereof forming an interlock adapted to clamp the glass between the same and the bowl portion when the latter is inserted in the molten glass, for drawing the latter as and for the purposes specified.

In testimony whereof I affix my signature hereto.

JOHN R. SCOHY.